United States Patent
Payen et al.

(10) Patent No.: US 6,713,208 B2
(45) Date of Patent: Mar. 30, 2004

(54) VENT VALVE AND A STORAGE CELL INCLUDING IT

(75) Inventors: Stéphane Payen, Nersac (FR); Alain Raymond, Voeuil et Giget (FR)

(73) Assignee: Alcatel, Paris (FR)

( * ) Notice: Subject to any disclaimer, the term of this patent is extended or adjusted under 35 U.S.C. 154(b) by 159 days.

(21) Appl. No.: 10/022,894

(22) Filed: Dec. 20, 2001

(65) Prior Publication Data

US 2002/0086201 A1 Jul. 4, 2002

(30) Foreign Application Priority Data

Jan. 4, 2001 (FR) .............................................. 01 00077

(51) Int. Cl.[7] .............................................. H01M 2/12
(52) U.S. Cl. .............................. 429/53; 429/82; 429/54
(58) Field of Search ................ 429/54, 82; 220/203.11, 220/203.28, 203.29; 222/396

(56) References Cited

U.S. PATENT DOCUMENTS

| | | | |
|---|---|---|---|
| 3,484,301 A | 12/1969 | Gray | 136/178 |
| 3,715,239 A | 2/1973 | Walder et al. | 136/133 |
| 3,994,749 A | * 11/1976 | Decker et al. | 429/53 |
| 4,662,533 A | * 5/1987 | Takahashi et al. | 220/203.13 |
| 4,993,602 A | 2/1991 | Casey | 222/396 |

FOREIGN PATENT DOCUMENTS

JP          5190164          7/1993

* cited by examiner

*Primary Examiner*—Patrick Ryan
*Assistant Examiner*—Thomas H. Parsons
(74) *Attorney, Agent, or Firm*—Sughrue Mion, PLLC

(57) ABSTRACT

A vent valve includes a vent cap closed by a cover plate with an orifice through it. The vent cap has a circular section and includes two diametrically opposed vent holes on its circumferential wall. An elastic seal having three vertices arranged in a triangle and connected in pairs by respective circular arcs—and preferably in the shape of a REULEAU triangle—is compressed between the bottom of the vent cap and the cover plate. The seal therefore blocks the orifice. If the fluid pressure at the orifice is sufficiently high, the fluid compresses the seal further and makes a path for itself between the seal and the cover plate and then escapes through the vent holes. The vent valve is suitable for use in a storage cell, in which case the cover plate can be used to close its casing.

25 Claims, 4 Drawing Sheets

VENT VALVE AND A STORAGE CELL INCLUDING IT

CROSS-REFERENCE TO RELATED APPLICATIONS

This application is based on French Patent Application No. 01 00 077 filed Jan. 4, 2001, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a vent valve which can be used as a safety valve for a storage cell, for example an aqueous electrolyte storage cell. The invention also relates to a storage cell equipped with the vent valve.

2. Description of the Prior Art

Aqueous electrolyte storage cells, for example nickel-cadmium storage cells, generally include a casing that is sealed to prevent electrolyte from leaking out and oxygen and pollutants from entering. The electrochemical system of this kind of cell can give off large quantities of gas in operation, or the cell may become overheated. This increases the pressure of the gases and/or air trapped in the casing of the cell. In particular, this occurs if the cell is subjected to intense, or even abusive, operating conditions, under which it delivers excessive electrical currents. This increase in pressure can deform the casing of the cell and cause the casing to leak or even explode. To prevent this, storage cells are generally equipped with safety valves that evacuate the gases to the outside if the pressure inside the casing exceeds a given threshold.

There is a first type of safety valve that includes an elastomer member that is ruptured by the pressure inside the storage cell if it exceeds a particular threshold. This type of vent valve has the drawback that it can be used only once: once broken, the membrane no longer seals the cell, even if operating conditions return to normal.

A second type of safety valve includes a seal blocking an orifice in the casing of the storage cell. The seal opens to free the orifice and allow the gas to escape from the interior of the casing if the pressure exceeds a given level, and then closes again when the pressure inside the casing falls below that given level. Operation of this device relies on retaining the seal, which takes the form of a gasket, against the perimeter of the orifice in the casing by means of a resilient member such as a spring. This solution has the drawback of necessitating a large space to house the gasket and the spring. It also has a high unit cost because of the number of components and the need to assemble them to the cell.

FIGS. 1, 2a and 2b show a further solution. The vent valve 1 is on the outside of a cover plate 2. The cover plate 2 seals the top part of the casing of the storage cell, not shown. The vent valve 1 includes a vent cap 3 on the outside of the cover plate 2. The area of the cover plate 2 including the vent cap 3 is flat; the portion of the cover plate 2 shown diagrammatically in FIG. 1 is limited to this area. The vent cap 3 takes the form of a section of a circular cylindrical tube 4 delimited in the lengthwise direction by two planes perpendicular to its axis and one end of which is closed by a bottom 5. The other end of the section is fixed to the cover plate 2. The bottom 5 is flat and parallel to the flat area of the cover plate 2 including the vent cap 3. An orifice 6 in the cover plate 2 establishes communication between the inside of the casing of the cell and the inside of the vent cap 3. The orifice 6 is substantially coaxial with the cylindrical tube section 4. Two vent holes 7a and 7b are provided in the cylindrical tube section 4 at a level adjacent the bottom 5. The vent holes 7a and 7b are diametrally opposed. A seal 8 is provided inside the vent cap 3, to be more precise between its bottom 5 and the cover plate 2. The seal 8 is shown in FIGS. 2a and 2b. The seal 8 has the following external shape. It includes a part 9 in the shape of a circular cylinder section delimited in the lengthwise direction by two planes perpendicular to its axis. On each of the disk-shaped opposite faces of the part 9 is a respective frustoconical part 10a, 10b coaxial with the part 9. The diameter of the frustoconical parts 10a, 10b decreases from a diameter equal to the diameter of the part 9. Each of the frustoconical parts 10a, 10b is delimited by a plane perpendicular to the axis common to the part 9 and the frustoconical parts 10a, 10b. As a result the seal 8 has two parallel plane disk-shaped faces 11a, 11b. The seal 8 is made from an elastomer. At rest, when it is not fitted, the height of the seal 8—i.e. the distance between the two faces 11a and 11b—is greater than the distance between the bottom 5 of the vent cap 3 and the cover plate 2. On the other hand, the diameter of the part 9 of the seal 8 is less than the inside diameter of the tube section 4 of the vent cap 3. The seal 8 is placed inside the vent cap 3 with the face 11a pressed against the bottom 5 of the vent cap 3 and the other face 11b pressed against the cover plate 2. As a result the seal 8 is compressed between its two faces 11a and 11b. This is how the vent valve 1 works. Under normal operating conditions of the storage cell, the face 11b of the seal 8 is pressed elastically against the cover plate 2, around the orifice 6, because of the compression of the seal 8 between the bottom 5 of the vent cap 3 and the cover plate 2. Consequently, the seal 8 seals the orifice 6 in the cover plate 2. If the pressure inside the casing of the storage cells exceeds a given threshold, it further compresses the seal 8 against the bottom 5 to the point of allowing the gases to find a path for themselves between the face 11b and the cover plate 2 and thereby reach the free area defined between the circumference of the seal 8 and the tube section 4, whence the gases escape freely through the vent holes 7a and 7b to the external environment of the storage cell. The path taken by the gases is indicated by the arrows G in FIG. 1. When the pressure inside the casing returns to a value below the threshold, the seal 8 is again sealed to the cover plate 2, around the orifice 6. Consequently, the orifice 6 is blocked again.

This solution has a number of drawbacks. Firstly, the seal 8 is fabricated by injection/compression of an elastomer, which implies a high fabrication cost. To increase productivity, either the number of fabrication molds or the number of imprints per mold must be increased. Apart from the cost of the tooling, the second of these approaches causes variations in the height of the seal, and consequently variations in the pressure at which the vent valve 1 opens.

Furthermore, precise calibration of the pressure at which the vent valve 1 opens also depends on correct centering of the seal 8 relative to the orifice 6. This centering is achieved by the tube section 4 of the vent cap 5. The orifice 6 is centered relative to the tube section 4, which centers the seal 8. The seal 8 is centered in the tube section 4 by the part 9 of the seal 8, which has a diameter close to the inside diameter of the tube section 4. Nevertheless, for the vent valve 1 to be able to operate, the diameter of the part 9 of the seal 8 must be less than the inside diameter of the tube section 4 in all situations, in particular if the diameter of the seal 8 increases because of the compression of the seal 8 between its two faces 11a, 11b, due to the manner in which it is mounted, but also because of the action of the gases via the orifice 6. Otherwise, the circumference of the part 9 would be pressed against the inside surface of the tube section 4. There would then be a seal between these two components, which would restrict or even render impossible evacuation of gases toward the vent holes 7a, 7b in the event of an increase in pressure in the casing of the storage cell. Consequently, the vent valve would no longer function correctly. This solution therefore has a supplementary disadvantage in that the diameter of the seal 8 depends on two contradictory considerations: on the one hand, the diameter of the seal 8 must be as close as possible to the inside diameter of the vent cap 5, to center it relative to the orifice 6, and, on the other hand, the diameter of the seal 8 must be sufficiently less than the inside diameter of the vent cap 5 to allow sufficient degassing in the event of an increase in pressure in the casing of the storage cell.

U.S. Pat. No. 3,994,749 proposes a polygonal seal die-cut from a sheet of elastomer. However, that seal has the drawback of giving rise to a reliability problem in the automated dispensing of components during assembly of the vent valve. There is the risk of the seal becoming wedged between the rails or in the vibrating bowls, unlike a circular seal, which circulates easily.

An object of the present invention is to propose a seal that does not have the drawbacks of the seals described in the prior art and which enables more reliable automated dispensing of components, in particular using existing industrial plant.

SUMMARY OF THE INVENTION

To this end, the present invention proposes a vent valve including an elastic seal compressed by a first wall against an orifice in a second wall and surrounded by a third wall, which seal has a section in a plane parallel to the first wall or to the second wall having three vertices disposed in a triangle, the three vertices of the section of the seal being connected in pairs by respective circular arcs.

Each of the circular arcs is preferably on the outside of an imaginary triangle defined by the three vertices. Also, the radius of curvature of each of the circular arcs can advantageously be less than or equal to twice the length of a side of the imaginary triangle formed by the three vertices. Furthermore, the radius of curvature of each of the circular arcs is preferably greater than or equal to $L \times (3+\sqrt{3})/6$ where L is the length of a side of the imaginary triangle formed by the three vertices. It is particularly advantageous if the radius of curvature of each of the circular arcs is equal to the length of one side of the imaginary triangle formed by the three vertices.

The third wall preferably has a circular section. The diameter of the circle circumscribed on the three vertices of the section of the seal, when measured free of all external forces, is preferably greater than or equal to 0.8 times the inside diameter of the third wall. The diameter of the circle circumscribed on the three vertices of the section of the seal, when measured free of all external forces, can with greater advantage be greater than or equal to 0.9 times the inside diameter of the third wall. It is especially preferable if the diameter of the circle circumscribed on the three vertices of the section of the seal, when measured free of all external forces, is equal to the inside diameter of the third wall.

The first wall is preferably parallel to the second wall. The respective faces of the seal coming into contact with the first wall and the second wall are preferably parallel. The flanks of the seal defining the section are preferably all perpendicular to a common plane. The flanks of the seal defining said section are preferably all perpendicular to two faces of the seal respectively in contact with the first wall and the second wall.

The vertices of the section of the seal are preferably disposed in an equilateral triangle.

The orifice in the second wall is preferably centered on the axis of the third wall. Furthermore, at least one vent opening can be formed in the third wall or in the first wall. The valve preferably includes two vent openings in the third wall or in the first wall and diametrally opposed relative to the axis of the third wall.

In a preferred embodiment the distance between the first wall and the second wall is greater than or equal to the diameter of the circle circumscribed on the three vertices of the section of the seal, as measured free of all external forces, preferably greater than or equal to twice the diameter of the circle circumscribed on the three vertices of the section of the seal, as measured free of all external forces, and advantageously greater than or equal to three times the diameter of the circle circumscribed on the three vertices of the section of the seal, as measured free of all external forces.

Furthermore the seal can include a plurality of stacked layers of materials.

In another aspect the invention provides a storage cell including a vent valve according to the invention. The second wall can be part of a cover plate closing the storage cell. Furthermore, the second wall or the third wall can constitute a terminal of the storage cell.

Other features and advantages of the invention will become apparent on reading the following description of a preferred embodiment of the invention, which description is given by way of example and with reference to the accompanying drawings.

DETAILED DESCRIPTION OF THE PREFERRED EMBODIMENTS

Figure 1:
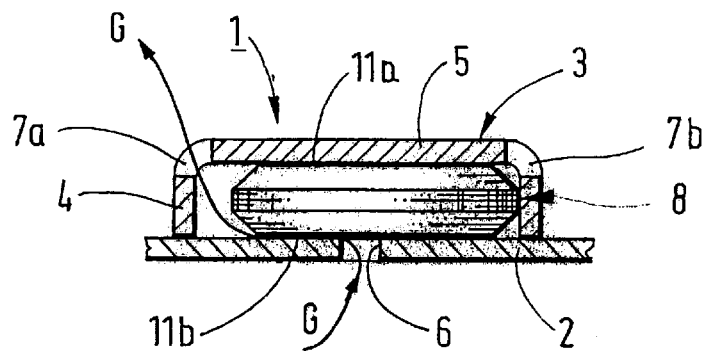
FIG. 1 shows diagrammatically a safety valve of a prior art storage cell.
Figure 2A:
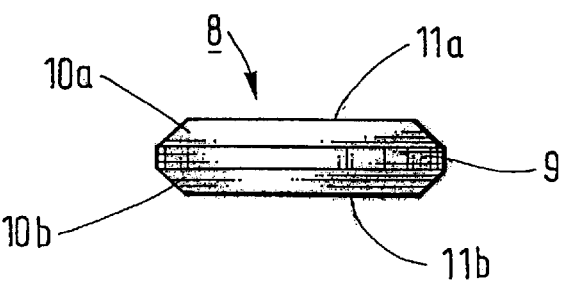
FIGS. 2a and 2b are respectively a diagrammatic front view and a diagrammatic top view of the seal of the FIG. 1 vent valve.
Figure 2B:
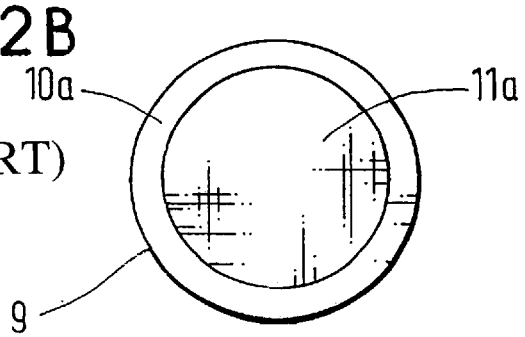
Figure 3:
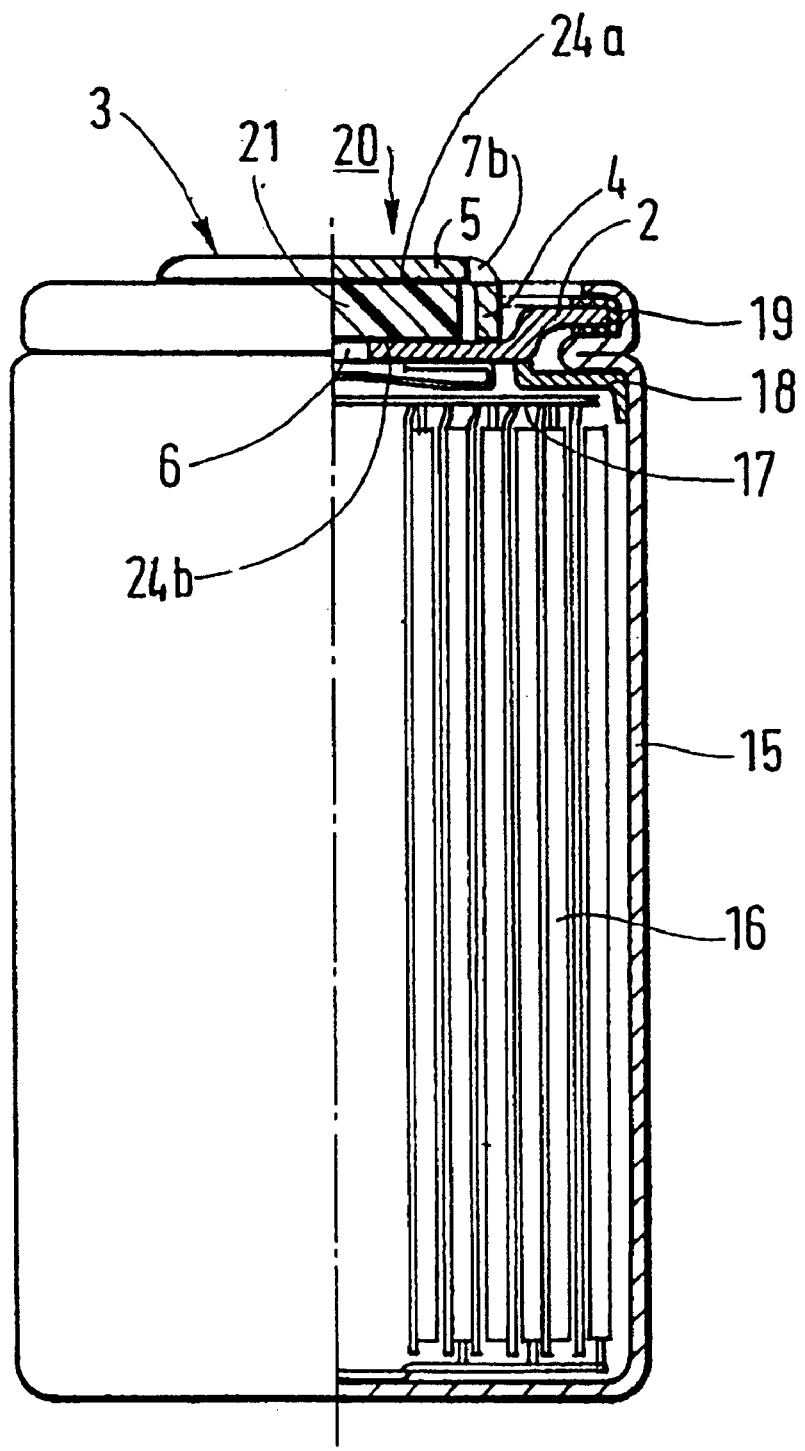
FIG. 3 is a diagrammatic half-view in half-section of a storage cell equipped with a safety valve according to the invention.

FIG. 3 shows a storage cell equipped with one embodiment of a safety valve 20 in accordance with the invention. The storage cell is of a conventional type. For example, it is a C or Cs format nickel-cadmium storage cell. It includes a sealed casing 15 in the form of a circular cylindrical container which contains the electrolyte and the electrodes 16, which are generally of spiral form, i.e. in the form of strips wound around a former. The casing 15 is sealed by a cover plate of the same type as the prior art cover plate described with reference to FIG. 1. For this reason the cover plate here is designated by the same reference number 2 as that shown in FIG. 1. The general shape of the cover plate 2 is that of a disk. It is fixed to the top part of the casing 15 by bending the top edge of the casing 15 around the periphery of the cover plate 2, as shown in FIG. 3, or by any other appropriate means. The seal between the casing 15 and the cover plate 2 is provided by a gasket 19 between the two components, for example. A generally annular member 18 attached to the inside of the casing 15 can advantageously provide a seat for the cover plate 2, in particular during the operation of bending the top edge of the casing 15 around the cover plate 2. The safety valve 20 is similar to the prior art vent valve 1 described with reference to FIG. 1 in that it includes a vent cap of the same type, identically arranged on the cover plate 2. For this reason the vent cap and its various portions are identified here by the same reference numbers as in FIG. 1. Clearly the characteristics of the cover plate 2 and the vent cap 3—in particular their shapes and their arrangement relative to each other—described with reference to FIG. 1 in describing the prior art are equally applicable to this embodiment of the invention. On the other hand, the vent valve 20 includes a seal 21 which replaces the prior art seal 8 shown in FIG. 2. The seal 21 will be described in more detail hereinafter. The cover plate 2 can advantageously have a dished shape around the flat area receiving the vent cap 3 in order to locate the latter when it is mounted on the cover plate 2, to center it relative to its orifice 6.

The vent cap 3 can be used as one terminal of the cell. To this end the electrodes 16 are electrically connected to a blade 17, for example by means of thin metal strips, or any other suitable means. The blade 17 bears elastically against the inside surface of the cover plate 2 to make electrical contact with it. The cover plate 2 is in turn in electrical contact with the vent cap 3. The person skilled in the art will naturally know how to choose electrochemically compatible materials for the thin metal strips, the blade 17, the cover plate 2 and the vent cap 3. Thus in the case of positive electrodes these components can be made from nickel-plated steel or nickel. In the case of negative electrodes they can be made from nickel or nickel-plated steel. If the casing 15 were to constitute the second terminal of the storage cell, the gasket 19 would also provide the necessary electrical insulation between the casing 15, on the one hand, and the vent cap 3 and the cover plate 2, on the other hand.

The vent cap 3 can be pressed to shape. The vent holes 7a and 7b are preferably made simultaneously with this pressing. The dished shape of the cover plate 2 can also be obtained by pressing it from a flat disk. The vent cap 3 can be spot welded or continuously welded to the cover plate 2. The person skilled in the art will understand that it is not necessary to provide a seal between the perimeter of the bottom end of the vent cap 3 and the cover plate 2.

Figure 4A:
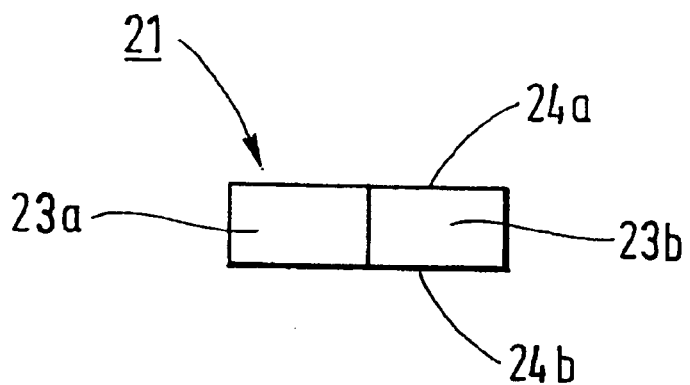
FIGS. 4a and 4b are respectively a diagrammatic front view and a diagrammatic top view of the seal according to the invention.
Figure 4B:
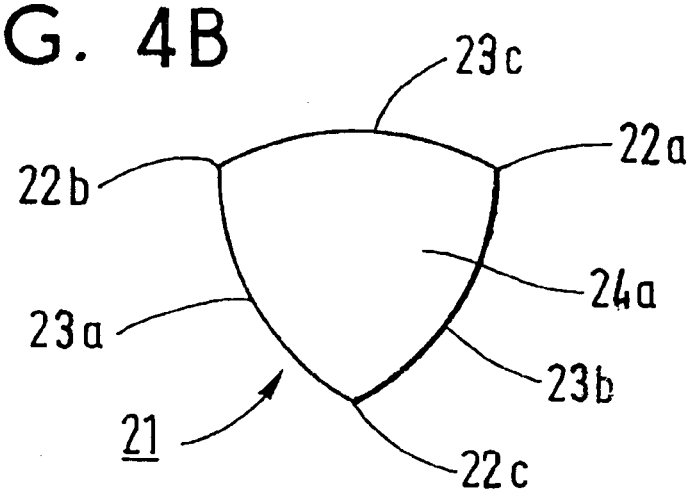

The seal 21 will now be described with reference to FIGS. 4a and 4b. The seal 21 takes the form of a section of solid rod whose length is delimited by two planes that are preferably parallel to each other. The section of the seal 21 has three vertices—here referenced 22a, 22b, 22c—disposed in a triangle, connected together in pairs by respective circular arcs, each of which therefore corresponds to a respective flank—here referenced 23a, 23b, 23c—of the seal 21. The curvature of the arcs is convex; in other words, the flanks 23a, 23b, 23c bulge outward. The three vertices 22a, 22b, 22c are preferably disposed in an equilateral triangle. The radius of curvature of the circular arcs connecting the three vertices 22a, 22b, 22c in pairs in a preferred equilateral configuration—i.e. the radius of curvature of the flanks 23a, 23b, 23c—is greater than the length of a side of the imaginary triangle formed by those three vertices divided by the square root of three. The seal 21 therefore has two parallel plane faces 24a, 24b. The three flanks 23a, 23b, 23c of the seal 21 are preferably all perpendicular to a common plane. In fact, all three flanks 23a, 23b, 23c could advantageously be perpendicular to the two faces 24a, 24b.

The seal 21 is made from an elastic material such as an elastomer. At rest—when it is not fitted to the storage cell and is free of any external forces—the height of the seal 21, i.e. the distance between the two faces 24a and 24b, is greater than the distance between the bottom 5 of the vent cap 3 and the cover plate 2. At rest, the diameter of the circumscribed circle of the section of the seal 21 is preferably equal to the inside diameter of the tube section 4 of the vent cap 3.

The seal 21 is placed inside the vent cap 3 with the face 24a pressed against the underside 5 of the vent cap 3 and the other face 24b pressed against the cover plate 2. As a result the seal 21 is compressed between its two faces 24a and 24b. Under normal operating conditions of the storage cell, the face 24b of the seal 21 is pressed elastically against the cover plate 2, around the orifice 6, because of the compression of the seal 21 between the bottom 5 of the vent cap 3 and the cover plate 2. Consequently, the seal 21 seals the orifice 6 in the cover plate 2. If the pressure inside the casing of the storage cell exceeds a given threshold, it further compresses the seal 21 against the bottom 5 to the point of allowing the gases to form a path for themselves between the face 24b and the cover plate 2 and thereby reach the free area defined between the flanks 23a, 23b, 23c of the seal 21 and the tube section 4, whence the gases escape freely through the vent holes 7a and 7b to the external environment of the storage cell. If the pressure inside the casing returns to a level below this threshold, the seal 21 is again pressed in a sealed manner onto the cover plate 2, around the orifice 6. Consequently, the orifice 6 is blocked again. In a variant that is not shown, the vertices of the section of the seal 21 can be rounded instead of pointed. In this case it is the diameter of the circle circumscribed on the section of the seal 21 at its rounded vertices that is preferably equal to the inside diameter of the tube section 4 of the vent cap 3.

As an alternative to this, the diameter of the circle circumscribed on the section of the seal 21 can equally be slightly less than the inside diameter of the vent cap 3. It can therefore be chosen so that, once compressed between the bottom 5 of the vent cap 3 and the cover plate 2, the diameter of the circle circumscribed on the section of the seal 21 corresponds to the inside diameter of the vent cap 3. As a general rule, the diameter of the circle circumscribed on the section of the seal 21—when not fitted to the storage cell and free of all external forces—is preferably chosen to be greater than or equal to 0.8 times, and advantageously 0.9 times, the inside diameter of the tube section 4 of the vent cap 3.

The skilled person will realize that the calibrated pressure at which the seal 21 opens depends in particular on the elasticity of the elastomer used and the degree of compression of the seal 21 in the vent cap, i.e. the ratio between the height of the seal 21 measured at rest and the distance between the bottom 5 of the vent cap 3 and the cover plate 2. The calibrated pressure also depends on the diameter of the orifice 6 and the dimensions of the section of the seal 21. The material of the seal 21 is chosen in accordance with its elasticity, which provides a seal between the seal and the orifice 6 up to the required gas pressure, and its ability to provide a seal around the orifice 6 as well as to resist the chemical agents contained in the storage cell. An elastomer such as EPDM (ethylene propylene diene monomer) can advantageously be used.

The shape of the seal 21 has several advantages. It precisely centers the seal 21 inside the vent cap 3. Consequently, the seal 21 is also precisely centered relative to the orifice 6 in the cover plate 2. This therefore improves the centering of the seal 21 relative to the orifice 6, compared to the prior art seal 8 shown in FIGS. 1, 2a and 2b. Consequently, there is much less variation in the calibrated pressure at which the seal 21 opens, because of its possible eccentricity relative to the orifice 6, in contrast to the prior art.

What is more, given the shape of its section, there is no risk of the seal 21 simultaneously blocking the two vent holes 7a, 7b. If a vertex of the section of the seal 21 is aligned with one of the two vent holes 7a, 7b and blocks it, the other vent hole is necessarily facing the opposite side of the section of the seal 21, and that side is necessarily at a distance from the vent hole. In other words, there is always a sufficient passage for the gases between the tube section 4 of the vent cap 3 and the flanks of the seal 21, leading to one of the two vent holes 7a, 7b. For this reason, the flanks 23a, 23b, 23c can advantageously be straight, in contrast to the prior art seal 8 shown in FIGS. 1, 2a and 2b. In the latter case, if the seal 8 is modified to have straight flanks over the whole of its height with a diameter corresponding to that of its part 9, there is a risk of it blocking both the vent holes 7a, 7b when the vent valve operates.

Because its flanks are perpendicular to the same plane, the seal 21 can be die-cut from an elastomer sheet—possibly one finished in a thicknesser—whose thickness corresponds to the height of the seal 21. This fabrication method is obviously not applicable to the prior art seal 8, because of its frustoconical parts 10a, 10b. This fabrication method has the advantage of providing seals 21 that all have a constant and precise height, in contrast to an injection/compression molding method using a multi-imprint mold. Because of the more precise height of the seal 21, there is less variation in the calibrated pressure at which the seal 21 opens from one seal to another, compared to the prior art seal 8. Also, productivity is improved and the unit cost is comparatively lower. As an alternative to the above, the seal 21 can be cut from an extruded elastomer rod having a section the same shape as the section of the seal 21. This method cannot be used to fabricate the prior art seal 8 either.

Figure 5:
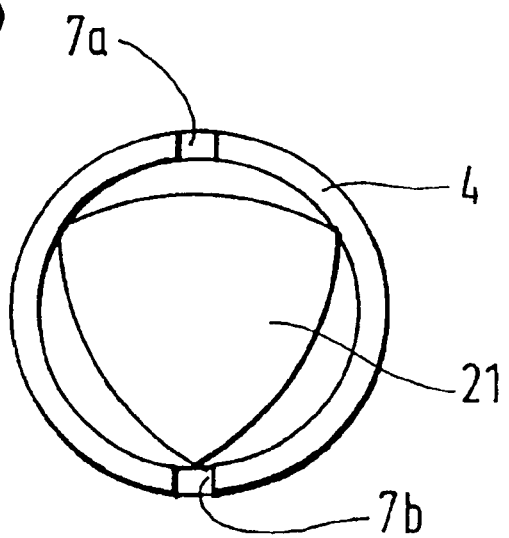
FIG. 5 is a diagrammatic cross section through the vent valve equipped with the seal shown in FIGS. 4a and 4b.

The flanks 23a, 23b, 23c, each of which is convex with a circular arc shape, have the advantage of more reliable automated dispensing of the seals during assembly of the vent valve. There is no risk of the seal 21 having this section becoming wedged in the dispensing rails and/or vibrating bowls equipping automated vent valve assembly machines. From this point of view, in the preferred equilateral configuration, it is preferable for the radius of curvature of the flanks 23a, 23b, 23c to be less than or equal to twice the length of a side of the imaginary triangle formed by the three vertices 22a, 22b, 22c. It is even more advantageous for the radius of curvature of the flanks 23a, 23b, 23c to be equal to the length of a side of the imaginary triangle formed by the three vertices 22a, 22b, 22c: in this case, the shape of the section of the seal 21 is a REULEAU triangle. FIGS. 4a and 4b show this configuration. In other words, the section of the seal is more advantageous the closer it approximates the shape of a REULEAU triangle. The property of the REULEAU triangle is to have a constant apparent diameter. By apparent diameter is meant the distance from any vertex of the REULEAU triangle, respectively 22a, 22b, 22c, to any point on the opposite flank, respectively 23a, 23b, 23c. Consequently, a seal with a section in the shape of a REULEAU triangle advantageously behaves like a disk in the dispensing rails and vibrating bowls of automated assembly machines. In particular, if the apparent diameter of the REULEAU triangle is chosen to be equal to the diameter of the part 9 of the prior art seal 8, the same dispensing rails and bowls can be used to distribute the seals 21 according to the invention. With this configuration, the seal 21 will be better centered in the vent cap 3 compared to the prior art seal 8, because the diameter of the circle circumscribed on the REULEAU triangle is greater than its apparent diameter. Also, the space between the flanks 23a, 23b, 23c and the tube section 4 of the vent cap 3 remains sufficiently large for effective degassing via the vent holes 7a and 7b. This situation is shown in FIG. 5, which represents a cross section through the tube section 4 of the vent cap 3 with the seal 21 in the shape of a REULEAU triangle mounted therein.

Generally speaking, to provide a sufficient passage for the gases between the flanks of the seal and the tube section, it is preferable for the radius of curvature R of the flanks 23a, 23b, 23c to satisfy the following condition:

$$R \geq L \times (3+\sqrt{3})/6$$

where L is the length of a side of the imaginary triangle formed by the three vertices 22a, 22b, 22c.

The following dimensions are given by way of example: the pressed steel vent cap 3 is 1 mm thick and has an inside diameter of 10 mm, and the distance from the bottom 5 to the cover plate 2 is 2 mm. The vent holes 7a and 7b each have a diameter of 1 mm. The cover plate 2 is made from steel 0.8 mm thick and has a 2 mm diameter orifice 6. The EPDM seal 21 with a section in the shape of a REULEAU triangle has a circumscribed diameter of 9 mm and a thickness of 2.5 mm measured at rest, free of external forces. The resulting vent valve opens at a pressure of the order of 20 bar.

Figure 6A:
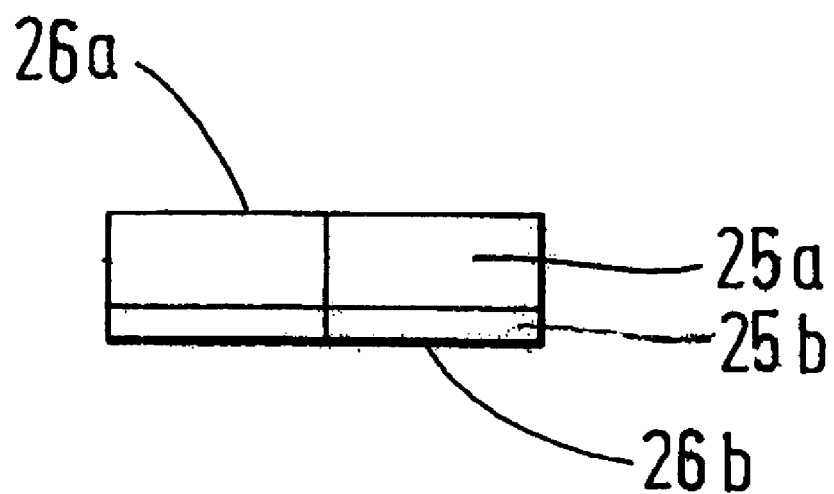
FIGS. 6a and 6b are respectively a diagrammatic front view and a diagrammatic top view of a variant of the seal shown in FIGS. 4a and 4b.
Figure 6B:
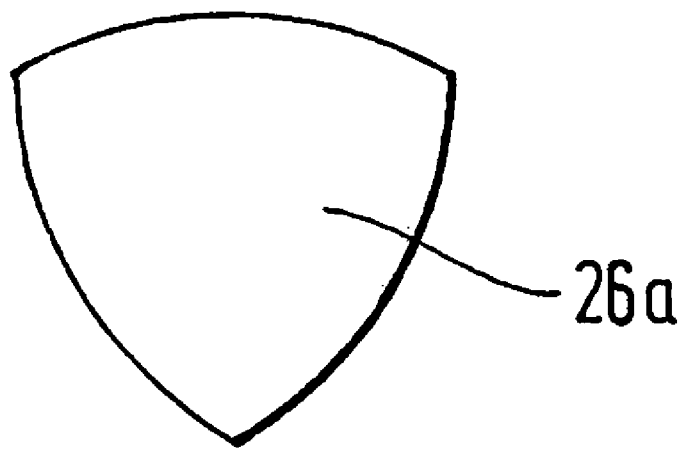

In a different embodiment, the seal 21 comprises two or more layers of different materials. FIGS. 6a and 6b show the seal from FIGS. 4a and 4b in a version with two layers of different materials. The bottom layer 25a at the same end as the face 26a is made from a first material and the layer 25b at the same end as the face 26b is made from a second material. Because it is the face 26b that blocks the orifice 6 in the cover plate 2, the first material can be chosen to resist the chemical agents contained in the storage cell and to provide a good seal, independently of its elasticity. In contrast, the second material is chosen because of its elasticity, to define the pressure at which the seal opens, without having to take account of its ability to form a seal. Thus EPDM can be chosen for the first material and polyethylene, polyamide or EPDM with a different hardness than that of the bottom layer 25a could be chosen for the second material. The seal 21 can equally be fabricated by die-cutting it from a sheet whose thickness corresponds to the height of the seal 21, the sheet being obtained by gluing together two sheets each having the thickness of the layer 25a or 25b and made from the corresponding material. As an alternative to this, the seal 21 can have a bottom layer, an intermediate layer and a top layer. In this case, the bottom and top layers are made from the first material previously cited and the intermediate layer is made from the second material previously cited, these materials having the same functions as in the version of the seal with two layers. The version with three layers has the advantage that the seal 21 can be mounted in the vent valve either way up, because each of the top and bottom layers is adapted to block the orifice 6.

The present invention also has the advantage that the seal 21 can be made tall in comparison to its circumscribed diameter. The vertices of its section hold the seal 21 effectively in position inside the tube section 4 of the vent cap 3 throughout its height. This avoids the risk of the seal buckling in the heightwise direction inside the vent cap 3, in contrast to the prior art seal 8. Buckling has the disadvantage of modifying the calibrated pressure at which the seal opens. The seal 21 compressed between the bottom 5 of the vent cap 3 and the cover plate 2 can thus have a height greater than or equal to its circumscribed diameter measured at rest or twice or three times that diameter. Because of this, it is permissible to define pressures at which the seal opens in ranges of pressures and applications in which the prior art seals 8 are inapplicable.

Of course, the present invention is not limited to the embodiment described and shown, and is open to many variants that will be evident to the person skilled in the art. Thus the section of the seal can be such that the vertices are connected by concave circular arcs, i.e. circular arcs that are reentrant toward the center of the section. Of course, the vent valve according to the invention can be provided directly on the casing of the storage cell, instead of on its cover plate. The vent holes in the vent cap need not be diametrally opposed relative to the vent cap, but instead have any angular offset that does not correspond to the angular offset between the vertices of the section of the seal. The vent cap of the vent valve can include more than two vent holes. The vent holes can be provided at a different level on the tube section 4, instead of being adjacent the bottom 5. As an alternative to this the vent holes can take the form of grooves extending all or part of the height of the tube section 4 from the cover plate 2 to the bottom 5, or even extending also onto the bottom 5. Of course, the vent cap 3 can also have an ellipsoidal section instead of being strictly circular. In this case, the section of the seal can be adapted as necessary, for example so that the vertices form an isosceles triangle so that each of the vertices touches the inside wall of the tube section 4 or the vertices are equidistant from that wall: this orients the seal inside the vent cap. Also, the vent valve according to the invention can be applied more generally to any pressurized casings other than those of storage cells.

There is claimed:

1. A vent valve including an elastic seal compressed by an upper first wall against an orifice in a lower second wall and surrounded by a third wall, which seal has a section, in a plane parallel to said first wall or to said second wall, having three vertices disposed in a triangle formed by three vertical flanks of the seal, said three vertices of said section of said seal being connected in pairs by respective circular arcs, and said three flanks being substantially perpendicular to upper and lower parallel faces of the seal.

2. The vent valve claimed in claim 1 wherein each of said circular arcs is on the outside of an imaginary triangle defined by said three vertices.

3. The vent valve claimed in claim 2 wherein the radius of curvature of each of said circular arcs is less than or equal to twice the length of a side of said imaginary triangle formed by said three vertices.

4. The vent valve claimed in claim 2 wherein the radius of curvature of each of said circular arcs is greater than or equal to $L \times (3+\sqrt{3})/6$ where L is the length of a side of said imaginary triangle formed by said three vertices.

5. The vent valve claimed in claim 2 wherein the radius of curvature of each of said circular arcs is equal to the length of one side of said imaginary triangle formed by said three vertices.

6. The vent valve claimed in claim 1 wherein said third wall has a circular section.

7. The vent valve claimed in claim 6 wherein the diameter of the circle circumscribed on said three vertices of said section of said seal, when measured free of all external forces, is greater than or equal to 0.8 times the inside diameter of said third wall.

8. The vent valve claimed in claim 7 wherein the diameter of the circle circumscribed on said three vertices of said section of said seal, when measured free of all external forces, is greater than or equal to 0.9 times the inside diameter of said third wall.

9. The vent valve claimed in claim 8 wherein the diameter of the circle circumscribed on said three vertices of said section of said seal, when measured free of all external forces, is equal to the inside diameter of said third wall.

10. The vent valve claimed in claim 6 wherein said orifice in said second wall is centered on the axis of said third wall.

11. The vent valve as claimed in claim 1 wherein said first wall is parallel to said second wall.

12. The seal claimed in claim 1 wherein said flanks of said seal defining said section are all perpendicular to a common plane.

13. The vent valve claimed in claim 1 wherein said flanks of said seal defining said section are all perpendicular to two faces of said seal respectively in contact with said first wall and said second wall.

14. The seal claimed in claim 1 wherein said vertices of said section of said seal are disposed in an equilateral triangle.

15. The vent valve claimed in claim 1 wherein at least one vent opening is formed in said third wall or in said first wall.

16. The vent valve claimed in claim 15 including two vent openings in said third wall or in said first wall and diametrically opposed relative to the axis of said third wall.

17. The vent valve claimed in claim 1 wherein the distance between said first wall and said second wall is greater than or equal to the diameter of the circle circumscribed on said three vertices of said section of said seal, as measured free of all external forces.

18. The vent valve claimed in claim 17 wherein the distance between said first wall and said second wall is greater than or equal to twice the diameter of said circle circumscribed on said three vertices of said section of said seal, as measured free of all external forces.

19. The vent valve claimed in claim 18 wherein the distance between said first wall and said second wall is greater than or equal to three times the diameter of said circle circumscribed on said three vertices of said section of said seal, as measured free of all external forces.

20. The vent valve claimed in claim 1 wherein said seal includes a plurality of vertically stacked layers of materials.

21. The vent valve claimed in claim 20, wherein said lower face is on a lower layer of a first material which is resistant to chemical agents contained in a storage cell including said vent valve, and which has no limit as to its elasticity, and wherein said upper face is on an upper layer of a second material having an elasticity greater than that of said first material, and having no limit as to its resistance to the chemical agents.

22. The vent valve claimed in claim 1, wherein said triangle is a Reuleau triangle in which the distance from any one of said vertices to its opposite vertical flank is constant and defines a constant apparent diameter.

23. A storage cell including a vent valve as claimed in claim 1.

24. The storage cell claimed in claim 22 wherein said second wall is part of a cover plate closing said storage cell.

25. The storage cell claimed in claim 22 wherein said second wall or said third wall constitutes a terminal of said storage cell.

* * * * *